United States Patent
Guan et al.

(10) Patent No.: US 11,379,271 B2
(45) Date of Patent: Jul. 5, 2022

(54) PARALLEL PROCESSING ON DATA PROCESSING SERVERS THROUGH EVEN DIVISION OF DATA RECORDS

(71) Applicant: Hangzhou Hikvision Digital Technology Co., Ltd., Hangzhou (CN)

(72) Inventors: Guochen Guan, Hangzhou (CN); Wukang Lin, Hangzhou (CN)

(73) Assignee: Hangzhou Hikvision Digital Technology Co., Ltd., Hangzhou (CN)

(*) Notice: Subject to any disclaimer, the term of this patent is extended or adjusted under 35 U.S.C. 154(b) by 869 days.

(21) Appl. No.: 16/078,774

(22) PCT Filed: Feb. 10, 2017

(86) PCT No.: PCT/CN2017/073203
§ 371 (c)(1),
(2) Date: Aug. 22, 2018

(87) PCT Pub. No.: WO2017/143912
PCT Pub. Date: Aug. 31, 2017

(65) Prior Publication Data
US 2021/0191783 A1    Jun. 24, 2021

(30) Foreign Application Priority Data
Feb. 23, 2016  (CN) .......................... 201610099562.5

(51) Int. Cl.
*G06F 9/50*  (2006.01)
*G06F 9/48*  (2006.01)

(52) U.S. Cl.
CPC ............ *G06F 9/5066* (2013.01); *G06F 9/485* (2013.01); *G06F 9/4881* (2013.01)

(58) Field of Classification Search
CPC ...... G06F 9/5066; G06F 9/485; G06F 9/4881; G06F 16/2471; G06F 16/27
(Continued)

(56) References Cited

U.S. PATENT DOCUMENTS

2004/0244055 A1    12/2004   Takada et al.
2014/0059000 A1*    2/2014   Hosouchi ............... G06F 16/21
                                                    707/609
(Continued)

FOREIGN PATENT DOCUMENTS

CN    102004670 A    4/2011
CN    103226467 A    7/2013
(Continued)

OTHER PUBLICATIONS

Masaya et al. JP2002032280A Description Translation, Jul. 17, 2000, [database online], [retrieved on Apr. 23, 2021] Retrieved from Global Dossier using Internet, pp. 1-28 (Year: 2000).*

(Continued)

*Primary Examiner* — Meng Ai T An
*Assistant Examiner* — Hsing Chun Lin
(74) *Attorney, Agent, or Firm* — Clements Bernard Baratta; Lawrence A. Baratta, Jr.; Ryan Odessa

(57) ABSTRACT

Data processing method and apparatus applicable to a client in a distributed data processing system. The method includes receiving a data processing instruction for to-be-processed data, determining an active region, obtaining data distribution information of the active data region, dividing a data range of each active data region into at least one sub-data range, generating a data processing task for each active data region, sending the task scheduler a data processing request which determines a data processing server executing each data processing task and sends the data processing server the data processing task to be processed by it, and receives processing results of performing data processing for the allocated sub-data ranges, receiving a processing result fed back by the task scheduler and with respect to the to-be-processed data. The method and apparatus improve the parallel processing speed of data processing servers and overall processing performance of the system.

6 Claims, 7 Drawing Sheets

(58) Field of Classification Search
USPC .......................................................... 718/104
See application file for complete search history.

(56) References Cited

U.S. PATENT DOCUMENTS

| | | |
|---|---|---|
| 2015/0156276 A1 | 6/2015 | Xue et al. |
| 2015/0370604 A1* | 12/2015 | Miwa .................... G06F 9/5083 |
| | | 718/104 |
| 2017/0039470 A1* | 2/2017 | Hirayama .......... G06Q 10/0639 |

FOREIGN PATENT DOCUMENTS

| | | | |
|---|---|---|---|
| CN | 103324533 A | | 9/2013 |
| CN | 105094981 A | | 11/2015 |
| JP | 2002032280 A | * | 1/2002 |

OTHER PUBLICATIONS

Tom White; Hadoop:The Definitive Guide Storage and Analysis at Internet Scale; Apr. 17, 2015; O'Reilly Media, Inc.,4th Edition.
International Search Report for International Application No. PCT/CN2017/073203 dated May 24, 2017.

* cited by examiner

US 11,379,271 B2

PARALLEL PROCESSING ON DATA PROCESSING SERVERS THROUGH EVEN DIVISION OF DATA RECORDS

The present application claims the priority to a Chinese patent application No. 201610099562.5 entitled "Method and Device for Data Processing" filed on Feb. 23, 2016 with the State Intellectual Property Office of the People's Republic of China, which is incorporated herein by reference in its entirety.

TECHNICAL FIELD

The present application relates to the technical field of distributed computing, and particularly to a data processing method and apparatus.

BACKGROUND

In an era of information explosion, as the amount of data available to a user grows exponentially, computing resources required to process data stored in a database system increase which leads to higher requirements for the computing performance of a data processing server in the database system. In a database system based on a conventional centralized database (called a centralized database system), the data processing server is usually included of a single computer. As the amount of data increases rapidly, due to the limited capabilities of the single computer, it is very difficult to meet the user's needs for data processing by improving the computing performance of the single computer.

In the relevant art, a data processing method applied to a storage server based database system (called a distributed data processing system) is provided. The distributed data processing system includes a storage server, one managing server and a plurality of data processing servers. A database is divided into a plurality of data regions in which are contained a plurality of data records. In data processing, the managing server first obtains a data processing instruction with for to-be-processed data, creates a plurality of data processing tasks for stored data records based on the number of data regions in the distributed data processing system, and then distributes data processing tasks to respective data processing servers. Each data processing server, after receiving the respective data processing task, processes the data records included in the data processing task, and returns processing results to the managing server. The data processing is thereby completed.

Compared with the centralized database system, the amount of data to be processed by a single computer is reduced in the distributed data processing system, and requirements for the computing performance of the single computer are therefore reduced. However, since the data processing tasks are created based on the number of data regions, and the number of data records included in different data regions may not the same, the number of data records included in each data processing task created accordingly may not the same. Thus, creating data processing tasks according to the number of data regions is likely to cause the tasks are not evenly distributed to the data processing servers for execution. For example, for data processing servers having the same computing performance, some data processing servers have a very large number of tasks whereas some data processing servers have almost none tasks. Apparently, the data processing tasks are unevenly distributed to respective data processing servers. Furthermore, such uneven distribution will slow down the overall processing of the distributed data processing system.

SUMMARY

An object of the embodiments of the present application is to provide a data processing method and apparatus, to evenly distribute data records in a database of a distributed data A processing system to data processing servers in the system, improving the parallel processing speed of data processing servers in the distributed data processing system, and thereby improving the overall processing performance of the distributed data processing system.

To achieve the above object, embodiments of the present application provide a data processing method, applicable to a client in a distributed data processing system; wherein the distributed data processing system includes: the client, a task scheduler, a plurality of data processing servers and a plurality of storage servers; the storage servers store a plurality of data regions, each of which contains a plurality of data records, the method including:

receiving a data processing instruction for to-be-processed data;

determining an active data region according to the data processing instruction; wherein the active data region is a data region of the to-be-processed data;

obtaining data distribution information of data records in the active data region; wherein the data distribution information is information obtained by calculating the number of data records in each data region through statistics according to a preset statistical rule;

dividing a data range of each active data region into at least one sub-data range according to the data distribution information;

generating a data processing task for each active data region according to each of the at least one sub-data range obtained from the division; wherein one data processing task corresponds to one sub-data range of an active data region;

sending a data processing request for the data processing task to the task scheduler, such that the task scheduler determines for each data processing task a data processing server to execute it, according to the data processing request, wherein the task scheduler, after determining data processing servers, sends data processing tasks to the determined data processing servers for execution, and receives processing results of performing data processing on the allocated sub-data ranges from the data processing servers;

receiving a processing result of the to-be-processed data fed back by the task scheduler.

Preferably, the storage server obtains the data distribution information of data records in a data region $R_i$ of the data regions through statistics by performing the following steps:

sorting, by the storage server, data records in the data region $R_i$ by a preset identifier;

dividing the data region $R_i$ into at least one data interval according to a sorted order of the sorted data records in the data region $R_i$;

obtaining the number of data records in each of the at least one data interval through statistics;

obtaining the data distribution information of the data records in the data region $R_i$ according to the numbers obtained through statistics.

Preferably, obtaining the data distribution information of the data records in the data region $R_i$ according to the numbers obtained through statistics includes:

calculating a variance of the number of data records in the data region $R_i$;

determining whether the variance is greater than a preset data region variance threshold;

if the variance is greater than the preset data region variance threshold, determining whether the following expression is satisfied: $N_{um} \geq Th_1$ or $N_{um} \leq Th_2$, and if it is satisfied, calculating through statistics the number of data records in each of the at least one data interval obtained from division of the data region $R_i$, and updating the data distribution information with the numbers obtained through statistics; wherein $N_{um}$ represents the number of data records in each of the at least one data interval obtained from division of the data region $R_i$, $Th_1$ represents a first preset number threshold, $Th_2$ represents a second preset number threshold, and $Th_1 \geq Th_2$;

if the variance is not greater than the preset data region variance threshold, maintaining the current data distribution information unchanged.

Preferably, obtaining the data distribution information of the data records in the data region $R_i$ according to the numbers obtained through statistics includes:

determining whether the number of data records in the data region $R_i$ satisfies a preset data interval adjustment condition;

if so, adjusting each of the at least one data interval in the data region $R_i$ according to a preset interval adjustment rule, and obtaining data distribution information of data records in the data region $R_i$ according to the number of data records in each of the adjusted at least one data interval;

wherein the preset interval adjustment rule includes:

obtaining, in the data region $R_i$, a data interval having a number of data records greater than a first preset number threshold $Th_1$;

according to a preset data interval split rule, splitting the data interval having a number of data records greater than $Th_1$ into a plurality of sub-data intervals.

Preferably, the preset interval adjustment rule further includes:

obtaining, in the data region $R_i$, a data interval having a number of data records smaller than a second preset number threshold $Th_2$;

according to a preset data interval merge rule, merging data intervals having a number of data records smaller than $Th_2$.

Preferably, determining, by the storage server, whether the number of data records in the data region $R_i$ satisfies the preset data interval adjustment condition includes:

calculating a variance of the number of data records in each of the at least one data interval obtained through statistics;

determining whether the variance obtained from calculation is greater than a preset variance threshold;

if the variance is greater than the preset variance threshold, determining that the number of data records in each of the at least one data interval obtained through statistics satisfies the preset data interval adjustment condition.

Preferably, in the case that the client has stored the data distribution information, the method further includes:

receiving a data update notification from the storage server;

updating the data distribution information stored locally, according to the data update notification.

To achieve the above object, an embodiment of the present application provides a data processing apparatus, applicable to a client in a distributed data processing system; wherein the distributed data processing system includes: the client, a task scheduler, a plurality of data processing servers and a plurality of storage servers; the storage servers store a plurality of data regions, each of which contains a plurality of data records are stored, the apparatus including:

a processing instruction receiving module, configured to receive a data processing instruction for to-be-processed data.

an active data determining module, configured to determine an active data region according to the data processing instruction; wherein the active data region is a data region of the to-be-processed data;

a distribution information obtaining module, configured to obtain data distribution information of data records in the active data region; wherein the data distribution information is information obtained by calculating the number of data records in each data region through statistics according to a preset statistical rule;

a data range dividing module, configured to divide a data range of each active data region into at least one sub-data range according to the data distribution information;

a task generating module, configured to generate a data processing task for each active data region according to each of the at least one sub-data range obtained from the division; wherein one data processing task corresponds to one sub-data range of an active data region;

a processing request sending module, configured to send a data processing request for the data processing task to the task scheduler, such that the task scheduler determines for each data processing task a data processing server to execute it, according to the data processing request; wherein the task scheduler, after determining data processing servers, sends data processing tasks to the determined data processing servers for execution, and receives processing results of performing data processing on the allocated sub-data ranges from the data processing servers;

a processing result receiving module, configured to receive a processing result of the to-be-processed data fed back by the task scheduler.

Preferably, the storage server includes: a data sorting submodule, an interval dividing submodule, a data statistics submodule and a distribution information obtaining submodule; wherein the data sorting submodule is configured to sort data records in the data region $R_i$ by a preset identifier;

the interval dividing submodule is configured to divide the data region $R_i$ into at least one data interval according to a sorted order of the sorted data records in the data region $R_i$;

the data statistics submodule is configured to obtain the number of data records in each of the at least one data interval through statistics;

the distribution information obtaining submodule is configured to obtain the data distribution information of the data records in the data region $R_i$ according to the numbers obtained through statistics.

Preferably, the distribution information obtaining submodule includes: a region variance calculating unit, a variance determining unit, a first information statistics unit and a second information statistics unit; wherein, the region variance calculating unit is configured to calculate a variance of the number of data records in the data region $R_i$;

the variance determining unit is configured to determine whether the variance is greater than a preset data region variance threshold;

the first information statistics unit is configured to, when the variance is greater than the preset data region variance threshold, determine whether the following expression is satisfied: $N_{um} \geq Th_1$ or $N_{um} \leq Th_2$, and if it is satisfied, calculate through statistics the number of data records in each of the at least one data interval obtained from division of the data region $R_i$, and update the data distribution information with the numbers obtained through statistics; wherein $N_{um}$ represents the number of data records in each of the at least one data interval obtained from division of the data region $R_i$, $Th_1$ represents a first preset number threshold, $Th_2$ represents a second preset number threshold, and $Th_1 \geq Th_2$;

the second information statistics unit is configured to, when the variance is not greater than the preset data region variance threshold, maintain the current data distribution information unchanged.

Preferably, the distribution information obtaining submodule includes: an adjustment condition determining unit and a first interval adjustment unit, wherein the adjustment condition determining unit is configured to determine whether the number of data records in the data region $R_i$ satisfies a preset data interval adjustment condition;

the first interval adjustment unit is configured to, when it is determined that the number of data records in the data region $R_i$ satisfies the preset data interval adjustment condition, adjust each of the at least one data interval in the data region $R_i$ according to a preset interval adjustment rule, and obtain data distribution information of data records in the data region $R_i$ according to the number of data records in each of the adjusted at least one data intervals;

wherein the preset interval adjustment rule includes:

obtaining, in the data region $R_i$, a data interval having a number of data records greater than a first preset number threshold $Th_1$;

according to a preset data interval split rule, splitting the data interval having a number of data records greater than $Th_1$ into a plurality of sub-data intervals.

Preferably, the preset interval adjustment rule further includes:

obtaining, in the data region $R_i$, a data interval having a number of data records smaller than a second preset number threshold $Th_2$;

according to a preset data interval merge rule, merging data intervals having a number of data records smaller than $Th_2$.

Preferably, the adjustment condition determining unit includes: an interval variance calculating subunit, an interval variance determining subunit and a processing condition determining subunit; wherein the interval variance calculating subunit is configured to calculate a variance of the number of data records in each of the at least one data interval obtained through statistics;

the interval variance determining subunit is configured to determine whether the variance obtained from calculation is greater than a preset variance threshold;

the processing condition determining subunit is configured to, when the variance is greater than the preset variance threshold, determine that the number of data records in each of the at least one data interval obtained through statistics satisfies the preset data interval processing condition.

Preferably, the apparatus further includes:

a data update notification receiving module, configured to receive a data update notification from the storage server, in the case that the data distribution information has been stored at the client;

a data distribution information update module, configured to update the data distribution information stored locally, according to the data update notification.

To achieve the above object, the present application further provides a client device in a distributed data processing system. The distributed data processing system further includes: a task scheduler, a plurality of data processing servers and a plurality of storage servers; the storage servers store a plurality of data regions, each of which contains a plurality of data records. The client apparatus includes:

a housing, a processor, a memory, a circuit board and a power supply circuit, wherein the circuit board is placed in a space enclosed by the housing, and the processor and the memory are disposed on the circuit board; the power supply circuit is configured to supply power to circuits or components of the client device; the memory is configured to store executable program code; the processor executes a program corresponding to the executable program code by reading the executable program code stored in the memory, to perform the following steps:

receiving a data processing instruction for to-be-processed data;

determining an active data region according to the data processing instruction; wherein the active data region is a data region of the to-be-processed data;

obtaining data distribution information of data records in the active data region; wherein the data distribution information is information obtained by calculating the number of data records in each data region through statistics according to a preset statistical rule;

dividing a data range of each active data region into at least one sub-data range, according to the data distribution information;

generating a data processing task for each active data region according to each of the at least one sub-data range obtained from the division; wherein one data processing task corresponds to one sub-data range of an active data region;

sending a data processing request for the data processing task to the task scheduler, such that the task scheduler determines for each data processing task a data processing server to execute it, according to the data processing request, wherein the task scheduler, after determining data processing servers, sends data processing tasks to the determined data processing servers for execution, and receives processing results of performing data processing on the allocated sub-data ranges from the data processing servers;

receiving a processing result of to-be-processed data the fed back by the task scheduler.

To achieve the above object, the present application further provides an application program which, when executed, performs the data processing method according to embodiments of the present application. The data processing method includes:

receiving a data processing instruction for to-be-processed data;

determining an active data region according to the data processing instruction; wherein the active data region is a data region of the to-be-processed data;

obtaining data distribution information of data records in the active data region; wherein the data distribution information is information obtained by calculating the number of data records in each data region through statistics according to a preset statistical rule;

dividing a data range of each active data region into at least one sub-data range, according to the data distribution information;

generating a data processing task for each active data region according to each of the at least one sub-data range obtained from the division; wherein one data processing task corresponds to one sub-data range of an active data region;

sending a data processing request for the data processing task to the task scheduler, such that the task scheduler determines for each data processing task a data processing server to execute it, according to the data processing request, wherein the task scheduler, after determining data processing servers, sends data processing tasks to the determined data processing servers for execution, and receives processing results of performing data processing on the allocated sub-data ranges from the data processing servers;

receiving a processing result of to-be-processed data the fed back by the task scheduler.

To achieve the above object, the present application further provides a storage medium configured to store an application which, when executed, performs the data processing method according to embodiments of the present application. The data processing method includes:

receiving a data processing instruction for to-be-processed data;

determining an active data region according to the data processing instruction; wherein the active data region is a data region of the to-be-processed data;

obtaining data distribution information of data records in the active data region; wherein the data distribution information is information obtained by calculating the number of data records in each data region through statistics according to a preset statistical rule;

dividing a data range of each active data region into at least one sub-data range, according to the data distribution information;

generating a data processing task for each active data region according to each of the at least one sub-data range obtained from the division; wherein one data processing task corresponds to one sub-data range of an active data region;

sending a data processing request for the data processing task to the task scheduler, such that the task scheduler determines for each data processing task a data processing server to execute it, according to the data processing request, wherein the task scheduler, after determining data processing servers, sends data processing tasks to the determined data processing servers for execution, and receives processing results of performing data processing on the allocated sub-data ranges from the data processing servers; receiving a processing result of to-be-processed data the fed back by the task scheduler.

As can be seen from the above, in the technical solutions according to embodiments of the present application, the client first receives a data processing instruction for to-be-processed data; determine an active data region according to the data processing instruction; then obtains data distribution information of data records stored in the active data region; divides a data range of each active data region into at least one sub-data range according to the data distribution information. The client generates a data processing task for each active data region according to respective sub-data ranges obtained from the division; sends a data processing request for the data processing task to the task scheduler, such that the task scheduler determines a data processing server executing each data processing task according to the data processing request. The task scheduler, after determining data processing servers, sends data processing tasks to the determined data processing servers for execution, and receives processing results of performing data processing on the allocated sub-data ranges from the data processing servers. The clients receives a processing result of the to-be-processed data fed back by the task scheduler. Obviously, with the solution provided by the present embodiment for data processing, the data processing tasks are allocated to respective data processing servers according to the number of data records in respective data regions, thereby avoiding the problem that the data processing tasks are unevenly allocated to the data processing servers, improving the parallel processing speed of data processing servers in the distributed data processing system, and thereby improving the overall processing performance of the distributed data processing system.

BRIEF DESCRIPTION OF THE DRAWINGS

Figures used in embodiments of the present application and the prior art will be described briefly below to more clearly illustrate technical solutions of embodiments of the present application and the prior art. Obviously, figures are provided for only some embodiments of the present application. Those having ordinary skill in the art may obtain other figures according to these figures without creative efforts.

DETAILED DESCRIPTION

The technical solutions of embodiments of the present application will be described in greater detail with references to figures. Obviously, embodiments described here are only some embodiments of the present application. All other embodiments obtained by those having ordinary skill in the art based on the embodiments herein, without any inventive efforts, fall within the scope of protection of the present application.

Figure 1A:
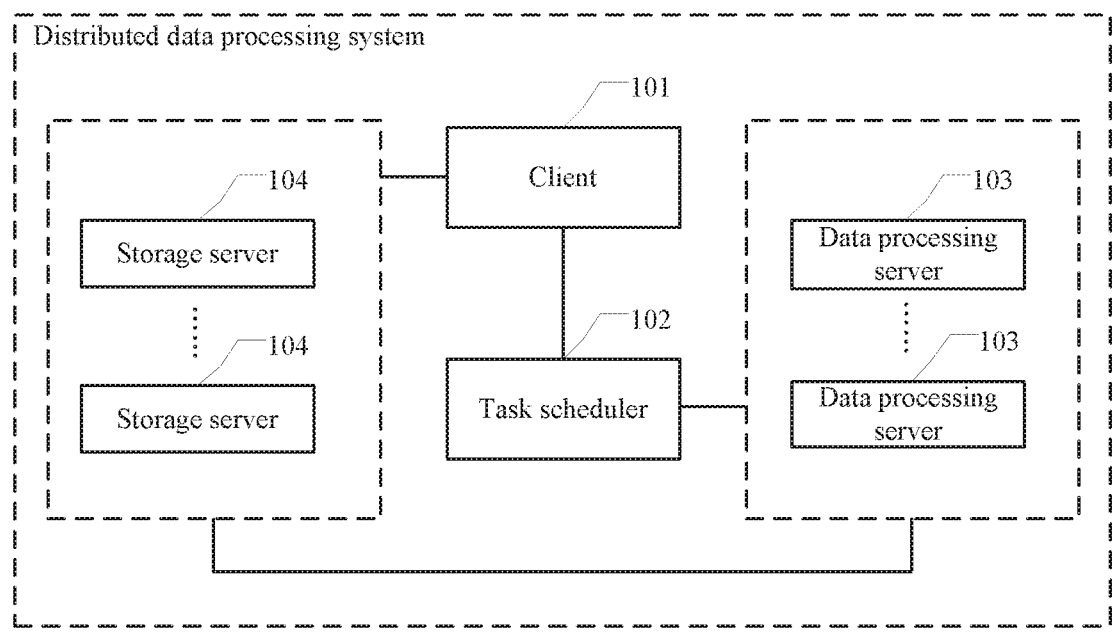
FIG. 1a is a schematic diagram of an architecture of a distributed data processing system according to an embodiment of the present application.

First, an application scenario of embodiments of the present application is introduced briefly as follows: the embodiments of the present application are applied to a client 101 in the distributed data processing system as shown in FIG. 1a. FIG. 1a is a schematic diagram of an architecture of a distributed data processing system according to an embodiment of the present application. Specifically, the distributed data processing system shown in FIG. 1a includes: a client 101, a task scheduler 102, a plurality of data processing servers 103 and a plurality of storage servers 104. The storage servers 104 store a plurality of data regions in which a plurality of data records are contained.

Figure 1B:
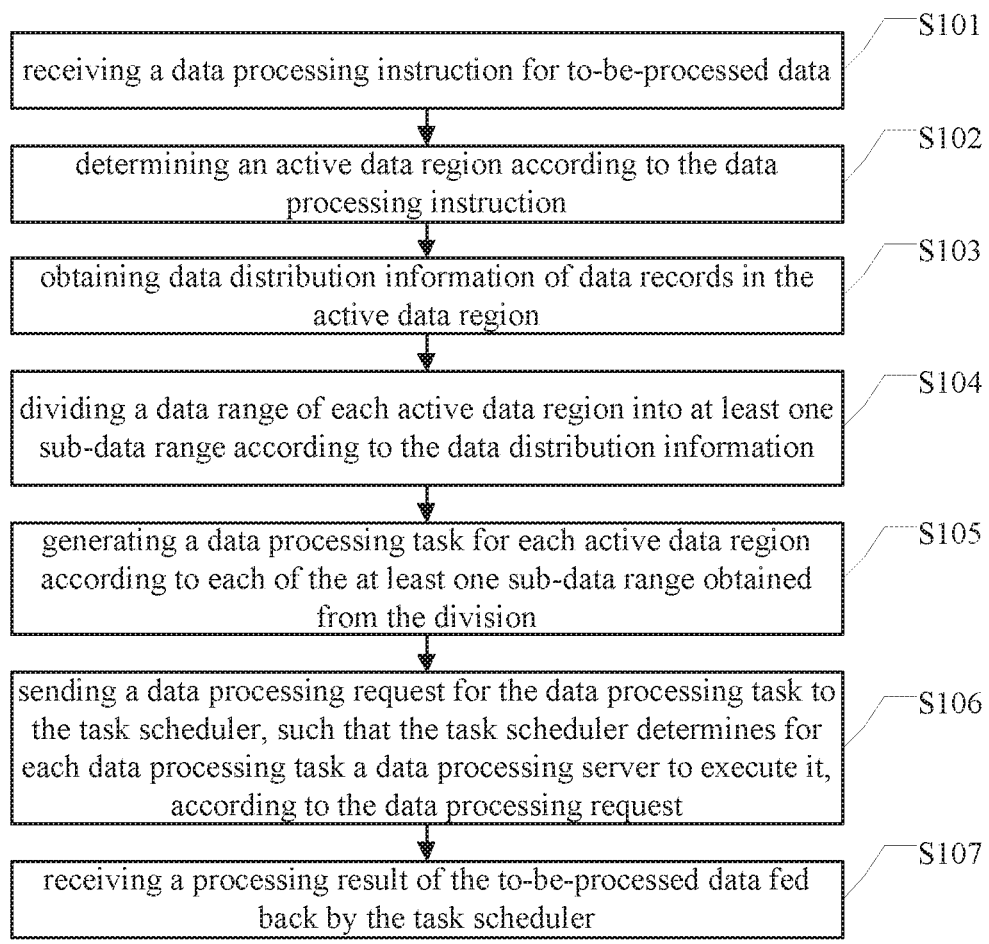
FIG. 1b is a flow chart of a data processing method according to an embodiment of the present application.

FIG. 1b is a flow chart of a data processing method according to an embodiment of the present application. The data processing method may include the following steps:

Step S101: receiving a data processing instruction for to-be-processed data.

The embodiment is implemented by the client in the distributed data processing system.

Specifically, the data processing instruction may carry a data range for the to-be-processed data. Alternatively, the data processing instruction may not carry the data range, at this point, the data range of the to-be-processed data is by default a data range including all data regions. Of course, whether the data processing instruction should carry a data range or not and the size of the data range will not be defined herein, and will be set by those skilled in the art according to actual situations in practical application.

Step S102: determining an active data region according to the data processing instruction.

The active data region is a data region of the to-be-processed data.

In a specific implementation of the embodiment, in the case that the data processing instruction carries the data range for the to-be-processed data, the data regions for the to-be-processed data may be determined according to the carried data range. The determined an active data region are usually several of a plurality of data regions, not all of them. However, in another specific implementation of the embodiment, the data processing instruction may not carry the data range for the to-be-processed data. At this point, it is believed by default that the the data processing instruction carries a range including all data regions, and all data regions are thus determined as the active data region. It should be understand that the specific value of the range of data regions will not be defined herein, and will be set by those skilled in the art according to actual situations in practical application.

Step S103: obtaining data distribution information of data records in the active data region.

Said "data distribution information" is information obtained by making statistics of the number of data records in each data region according to a preset statistical rule.

Generally, the step of obtaining the information by making statistics of the number of data records in each data region according to the preset statistical rule is performed by a storage server in the distributed data processing system.

Specifically, the "preset statistical rule" may be a rule for making statistics according to key value of data records stored in each of the data regions, or may be a statistical rule of making statistics according to another field in the data records preset by those skilled in the art. For example, data content of the stored data records is data about examination achievements of subjects of students in a class, wherein each data record includes information about such as name, student serial number, gender and subjects. The statistical rule for the data records in this example may be making statistics in the order of surnames, or may be making statistics in the order of student serial numbers, and so on. Of course, the embodiment of the present disclosure will not restrict the specific statistics rule, and any possible implementation can be applied to the present application.

Specifically, the client may obtain the data distribution information of data records stored in the data regions by sending a data distribution information acquisition request to the storage server, or may obtain such data from its data distribution information stored thereon. The former manner can obtain the accurate data distribution information of data records stored in the data regions, but it requires calculating the number of data records in respective data regions through statistics in real time, which occupies a lot of hardware resources. The latter manner can quickly obtain the data distribution information of data records in the data regions, but the data distribution information obtained in this manner might not be consistent with the actual number of data regions because of operations (e.g., addition or deletion of data records) performed on the data records.

It should be understand that the specific manner of obtaining the data distribution information of data records stored in the data regions will not be defined herein, and will be set by those skilled in the art according to specific situations in practical application.

In a specific implementation of the present application, the following steps may be performed to obtain the data distribution information of data records in any data region $R_i$ of the data regions:

(1) the storage server sorts data records in the data region $R_i$ by a preset identifier.

It should be understand that in this implementation, the specific steps of obtaining the data distribution information is performed by the storage server.

Said "preset identifier" may be the key value of a data record in each of the data regions in the storage server. In practical application, each data record in the storage server generally includes a plurality of fields, and one field is usually selected therefrom as a key value of the data record. It should be understand that the embodiment of the present application will not define the preset identifier. In addition to the abovementioned field used as the key value, other field may be selected as the basis for the sort. Those skilled in the art may reasonably set a basis for the sorting according to specific situations in practical application.

Further, in step (1) the data records may be arranged in a descending order by the identifier of data records in the data region $R_i$, or may be arranged in an ascending order by the identifier of data records in the data region $R_i$. The embodiment of the present application will not define the arrangement order.

(2) the storage server divides the data region $R_i$ into at least one data interval, according to the arrangement order of the sorted data records in the data region $R_i$.

It should be noted that after the data records in the data region $R_i$ are arranged by the preset identifier (namely, by the key value of the data records), the data region is divided into at least one data interval according to a range of values of the key value in the data region, and the range of values of the key in each data interval is determined as a range of values for that data interval.

For example, assuming that the value range of key value in the data region $R_i$ is 1-100, then the data region $R_i$ may be divided into four data intervals according to a preset data interval division rule, and the value ranges of the four data intervals are: 1-25, 26-50, 51-75 and 76-100.

Of course, the number of data intervals divided from the data region will not be defined herein, and will be set by those skilled in the art according to specific situations in practical application.

(3) the storage server makes statistics of the number of data records in each of the data intervals obtained from the division.

(4) the storage server obtains the data distribution information of the data records in the data region $R_i$ according to the numbers obtained from the statistics.

It should be noted that this manner of obtaining the data distribution information requires making statistics of the number of data records in each of the data intervals in the data region, and it can be seen that the amount of calculation performed for the statistics is very large.

In another specific implementation of the present application, the step (4) of obtaining the data distribution information of the data records in the data region $R_i$ according to the numbers obtained from the statistics may include the following steps:

1) calculating a variance of the number of data records in the data region $R_i$.

2) determining whether the variance is greater than a preset data region variance threshold.

3) if it is determined in step 2) that the variance is greater than the preset data region variance threshold, determining whether the following expression is satisfied: $N_{um} \geq Th_1$, or $N_{um} \leq Th_2$, and if so, making statistics of the number of data records in each of the data intervals obtained from the division of the data region $R_i$, and updating the data distribution information with the numbers obtained through the statistics.

Where $N_{um}$ represents the number of data records in each data intervals obtained from division of the data region $R_i$, $Th_1$ represents a first preset number threshold, $Th_2$ represents a second preset number threshold, and $Th_1 \geq Th_2$.

4) if it is determined in step 2) that the variance is not greater than the preset data region variance threshold, maintaining the current data distribution information.

It can be seen that in this implementation, the variance of the data region is calculated to determine the deviation of the number of data records stored in the data region from an average value. As such, it is possible to discover in time the data region with the number far exceeding the average value. Further, the embodiment determines the number of data records in a specific data interval in the data region has changed outside an allowed range ($Th_1$, $Th_2$), by determining the number of data records in the data interval is greater than the first preset number threshold or smaller than the second preset number threshold. Therefore, only the data records in this data interval are recalculated through statistics. It can be seen that the computation of the data distribution information is by far smaller than the computation of all data records in the data region.

Further, in another specific implementation of the present application, the step (4) of obtaining the data distribution information of the data records in the data region $R_i$ according to numbers obtained through statistics may include the following steps:

1) determining whether the number of data records in the data region $R_i$ satisfies a preset data interval adjustment condition.

Specifically, step 1) may include the following steps:

i. calculating a variance of the number of data records in each data interval obtained through statistics;

ii. determining whether the variance obtained from the calculation is greater than a preset variance threshold;

iii. when the variance is greater than the preset variance threshold, determining that the number of data records in each data interval obtained through statistics satisfies the preset data interval adjustment condition.

It may be understood that when it is determined that the variance of the number of data records in a data interval is greater than the preset variance threshold, it indicates that the number of data records in the data interval deviates far from the average value of the data records in the data intervals, or, the number of data records in the data interval has a greater deviation from those of other data intervals in the data region. At this point, it is believed that the data records in the data interval should be processed (e.g., division or merge of data interval(s)), namely, it is determined that the number of data records in the data intervals satisfies a preset data interval processing condition.

It should be understand that the present application will not define a specific value of the preset variance threshold mentioned above, and those skilled in the art may determine the specific value according to specific situations in practical application.

2) In the case that it is determined in step 1) that the preset data interval adjustment condition is satisfied, adjusting the data intervals in the data region $R_i$ according to a preset interval adjustment rule, and obtaining the data distribution information of data records in the data region $R_i$ according to the number of data records in the adjusted data intervals.

In a specific implementation of the present application, the preset interval adjustment rule includes:

A: obtaining, in the data region $R_i$, a data interval having a number of data records greater than the first preset number threshold $Th_1$;

B: according to the preset data interval division rule, splitting the data interval having a number of data records greater than $Th_1$ into a plurality of sub-data intervals.

It should be understand that splitting the data interval having a number of data records greater than $Th_1$ into a plurality of data intervals aims to control the number of data records in the data interval below $Th_1$. As such, it is possible to ensure that the required hardware resources do not exceed a certain value when the data records in the data intervals are processed, which facilitates reasonable allocation of the required hardware resources among the data intervals.

Figure 1C:
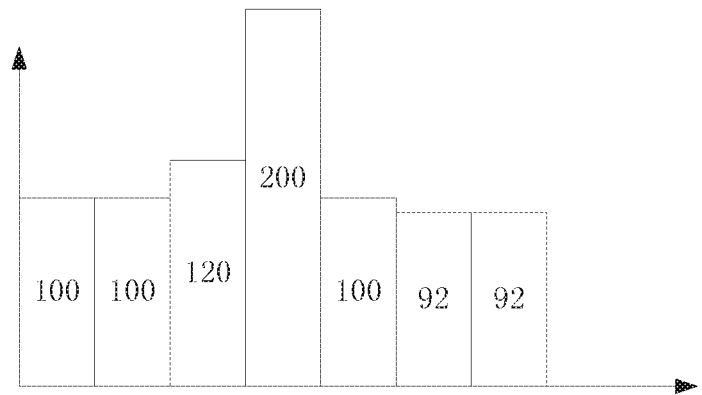
FIG. 1c is a distribution histogram of data intervals in a data region according to an embodiment of the present application.
Figure 1D:
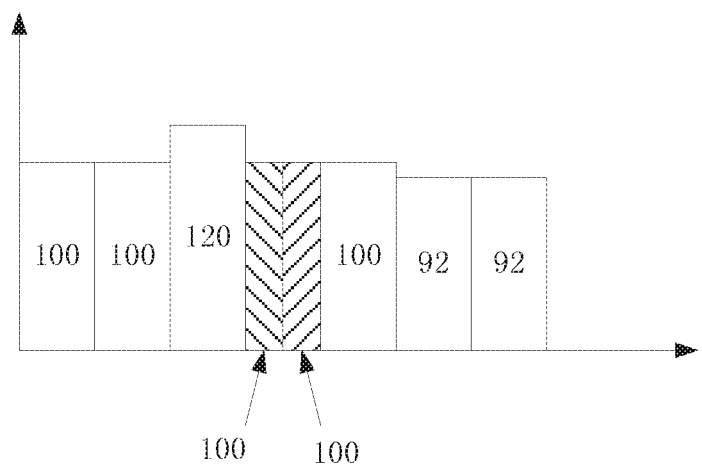
FIG. 1d is a distribution histogram of data intervals after division processing of FIG. 1c according to an embodiment of the present application.

For example, the first number threshold $Th_1$ is 120. As shown in FIG. 1c which is a statistics histogram of the number of data records in data intervals in the data region $R_i$, the number of data records in the fourth data interval from left is 200, obviously higher than the number of data records in other data intervals. Therefore, the data interval may be splitted into two sub-data intervals as shown in FIG. 1d, and the number of data records in the sub-data intervals are 100, 100 respectively.

It should be understand that when the data interval having a number of data records greater than $Th_1$ is splitted into a plurality of sub-data intervals, the number of data records in the sub-data intervals may or may not be the same. The number of the data records in the two sub-data intervals in the above example may be 110 and 90. The present application will not define the number of data records in the sub-data intervals obtained from division, and those skilled in the art may reasonbly set the number according to specific situations in practical application.

Further, in another specific implementation of the present application, the preset interval adjustment rule may further include:

C: obtaining, the data region $R_i$ obtained from statistics, in data interval having a number of data records smaller than the second preset number threshold $Th_2$;

D: according to a preset data interval merge rule, merging data intervals having a number of data records is smaller than $Th_2$.

It should be understand that merging the data intervals having a number of data records smaller than $Th_2$ can make the number of data records in the data intervals not too small. As such, when processing the data records in the data intervals, this better facilitates reasonable allocation of required hardware resources among the data intervals, without wasting resources.

Figure 1E:
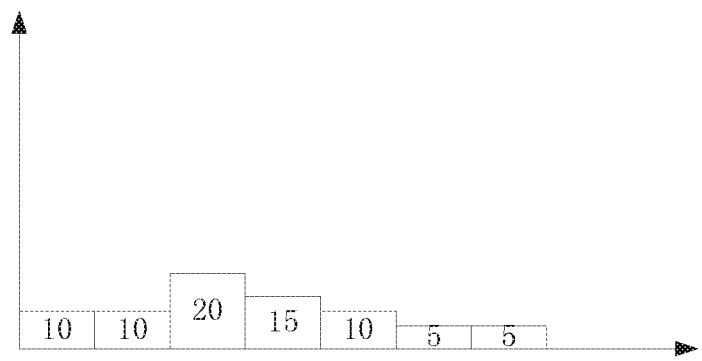
FIG. 1e is a distribution histogram of data intervals in another data region according to an embodiment of the present application.
Figure 1F:
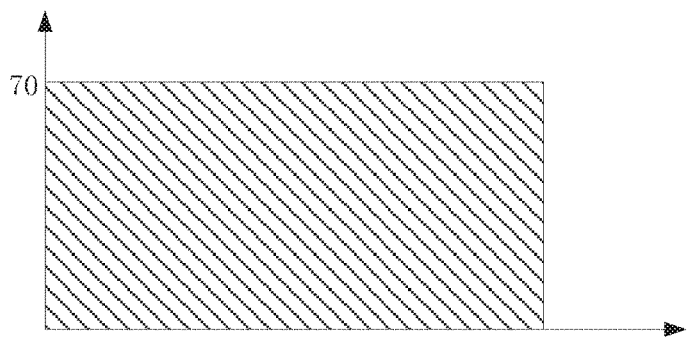
FIG. 1f is a distribution histogram of data intervals after merge processing of FIG. 1e according to an embodiment of the present application.

For example, the second number threshold $Th_2$ is 30. As shown in FIG. 1e which is a statistics histogram of the number of data records in data intervals in the data region $R_j$, the number of data records in each data interval is smaller than 30. Therefore, the data intervals may be merged into one data interval as shown in FIG. 1f, and the number of merged data interval is a sum 75 of the number of data records in all data intervals before the merge.

It can be seen that according to the above two preset data interval adjustment rules, the number of data intervals in respective data regions may be maintained within a reasonable range so that occupation of hardware resources in the data processing server by data intervals of data regions tends to be balanced.

Step S104: dividing a data range of each active data region into at least one sub-data range according to the data distribution information.

Step S105: generating a data processing task for each active data region according to each of the at least one sub-data range obtained from the division.

One data processing task corresponds to one sub-data range of an active data region.

In practical application, when data processing is performed on data records in the storage server, allocation of processing tasks directly affects the processing speed. In the solution according to the embodiment of the present application, the processing tasks are allocated according to the distribution information of the number of data records in respective data intervals in each data region. It may be appreciated that such allocation of data processing tasks allows hardware resources in each data processing server to match with the number of data records in the corresponding data intervals.

Step S106: sending a data processing request for the data processing task to the task scheduler, such that the task scheduler determines for each data processing task a data processing server to execute it, according to the data processing request.

The task scheduler, after determining data processing servers, sends the data processing tasks to the determined data processing server for execution, and receives processing results of performing data processing on the allocated sub-data ranges from the data processing servers.

Figure 1G:
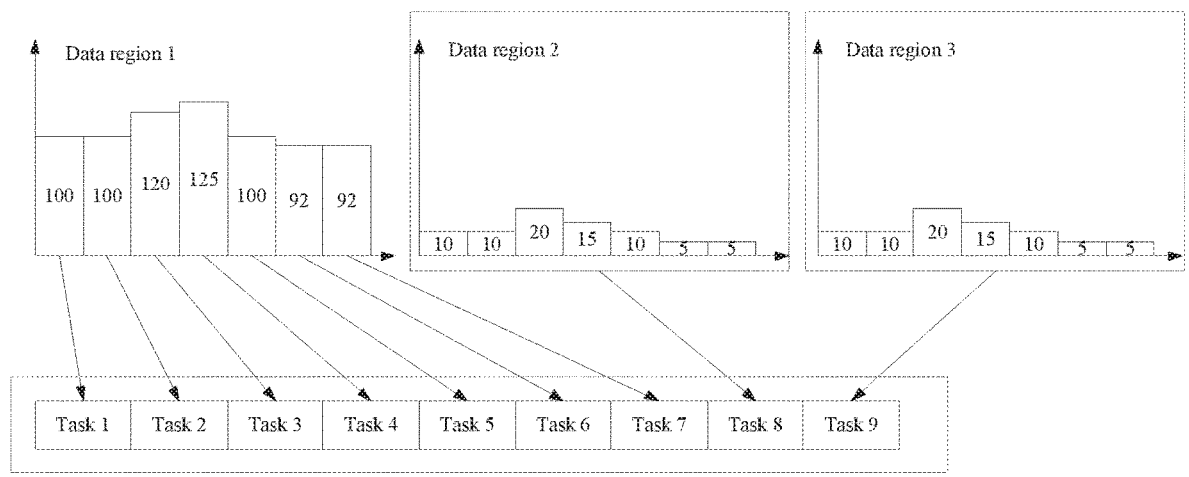
FIG. 1g illustrates an distribution of tasks according to an embodiment of the present application.

For example, FIG. 1g is a schematic diagram of allocation of tasks according to an embodiment of the present application. There are three active data regions for the to-be-processed data, nine data processing tasks are generated, and the number of data records corresponding to the data processing tasks does not exceed 130. The data processing tasks may be allocated as follows with respect to respective data intervals in the three active data regions:

Where a data interval represents a sub-data range corresponding to the data region.

regions in the prior art. Thus, the speeds of completing data processing by respective data processing servers are roughly equivalent, thereby improving overall processing performance of the distributed data processing system.

Step S107: receiving a processing result of the to-be-processed data fed back by the task scheduler.

It can be seen that in the solution of the present embodiment for data processing, the data processing tasks are allocated to respective data processing servers according to the number of data records in respective data regions. This avoids the problem that the data processing tasks are unevenly allocated to the data processing servers, improves the parallel processing speed of data processing servers in the distributed data processing system, and thereby improves the overall processing performance of the distributed data processing system.

Figure 2:
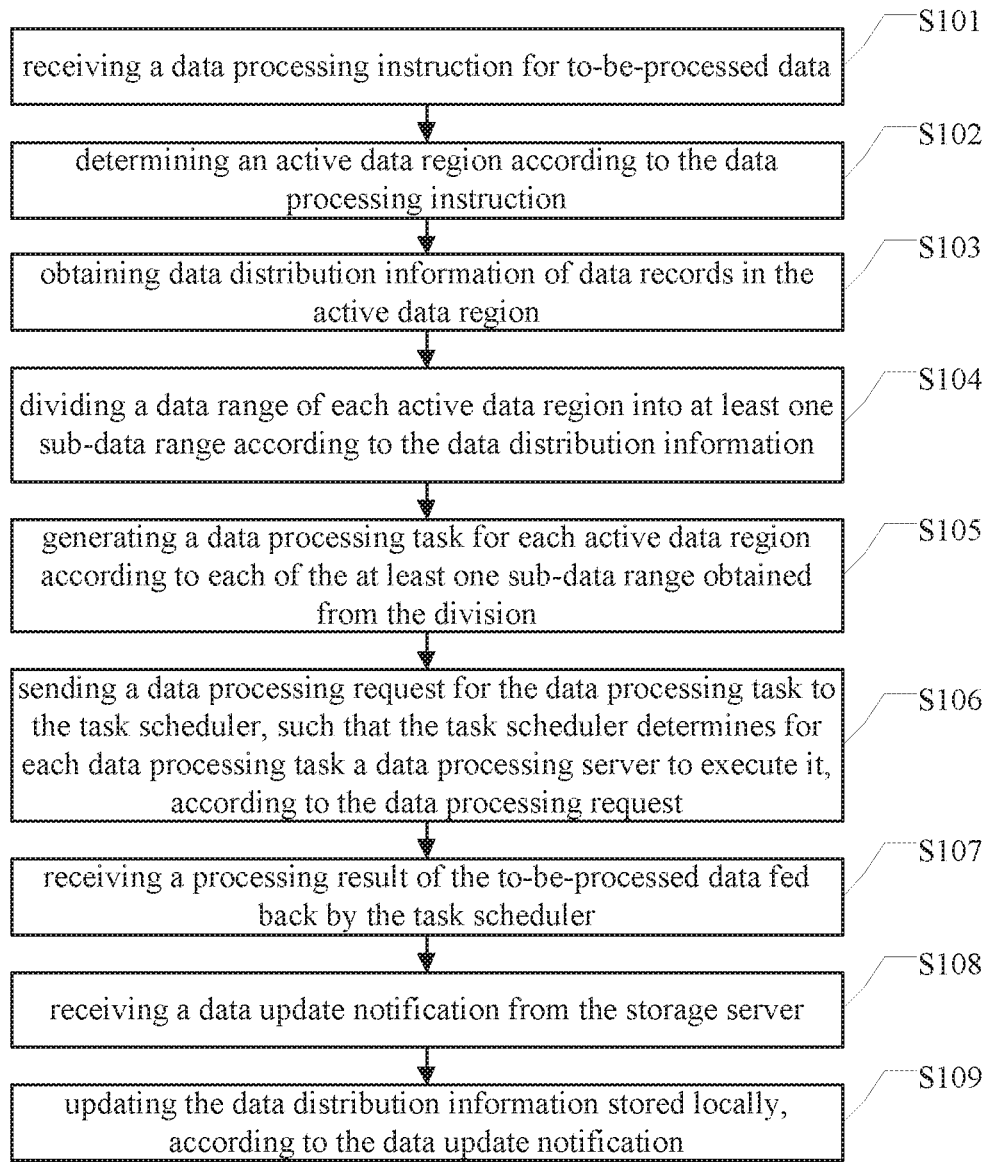
FIG. 2 is a flow chart of another data processing method according to an embodiment of the present application.

FIG. 2 is a flow chart of another data processing method according to an embodiment of the present application. On the basis of the embodiment shown in FIG. 1b, the method may further include: Step S108: receiving a data update notification from the storage server, in the case that the data distribution information of data records in the respective data regions stored locally.

That is, after obtaining the data distribution information of data records in the active data region, the client may store the data distribution information. With the data distribution information stored, the client may receive a data update notification from a storage server.

It is easy to understand that the data records in respective data regions in a storage server change dynamically. The addition or deletion of data records directly affects the distribution information of data in respective data regions. Therefore, in the case that the data distribution information of data records in the respective data regions is stored on the client, data update needs to be performed regularly to ensure the data distribution information stored on the client is consistent with the actual number of data records in data regions in the storage server as much as possible.

Step S109: updating the data distribution information stored locally, according to the data update notification.

On the one hand, in the solution of the present embodiment, the locally stored data distribution information of data records in respective data regions is updated, which ensures consistency between the data distribution information obtained by the client and actual data distribution in the storage server. On the other hand, in the solution of the present embodiment for data processing, the data processing tasks are allocated to respective data processing servers according to the number of data records in respective data regions. This thus avoids the problem that the data processing tasks are unevenly allocated to the data processing

|  | Data interval 1 | Data interval 2 | Data interval 3 | Data interval 4 | Data interval 5 | Data interval 6 | Data interval 7 |
|---|---|---|---|---|---|---|---|
| Data region 1 | Task 1 | Task 2 | Task 3 | Task 4 | Task 5 | Task 6 | Task 7 |
| Data region 3 |  |  |  | Task 8 |  |  |  |
| Data region 3 |  |  |  | Task 9 |  |  |  |

It can be understood that the data processing speed of the distributed data processing system generally depends on the data processing server that accomplishes data processing the slowest among the data processing servers. The number of data records to be processed through each of data processing tasks in FIG. 1g is roughly equal, thereby avoiding the problem of unbalanced allocation caused by allocating data processing tasks only according to the number of data servers, improves the parallel processing speed of data processing servers in the distributed data processing system, and thereby improves the overall processing performance of the distributed data processing system.

Figure 3:
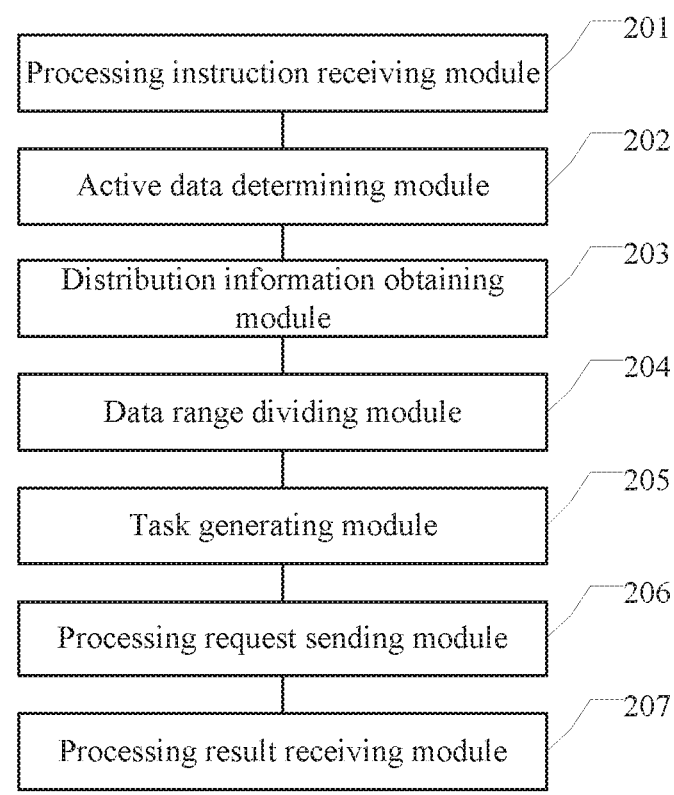
FIG. 3 is a schematic diagram of the structure of a data processing apparatus according to an embodiment of the present application.

FIG. 3 is a schematic diagram of the structure of a data processing apparatus according to an embodiment of the present application, applicable to the client in the distributed data processing system.

The distributed data processing system includes: a client, a task scheduler, a plurality of data processing servers and a plurality of storage servers; the storage servers store a plurality of data regions, each of which contains a plurality of data records.

The present embodiment corresponds to the method embodiment shown in FIG. 1b.

Specifically, the data processing apparatus may include the following modules:

A processing instruction receiving module 201, configured to receive a data processing instruction for to-be-processed data.

An active data determining module 202, configured to determine an active data region according to the data processing instruction.

Where the active data region is a data region of the to-be-processed data.

A distribution information obtaining module 203, configured to obtain data distribution information of data records stored in the active data region.

Where the data distribution information is information obtained by calculating the number of data records in each data region through statistics according to a preset statistical rule.

A data range dividing module 204, configured to divide a data range of each active data region into at least one sub-data range according to the obtained data distribution information.

A task generating module 205, configured to generate a data processing task for each active data region according to each of the at least one sub-data range obtained from the division.

Where one data processing task corresponds to one sub-data range of an active data region.

A processing request sending module 206, configured to send a data processing request for the data processing task to the task scheduler, such that the task scheduler determines for each data processing task a data processing server to execute it, according to the data processing request.

Where the task scheduler, after determining data processing servers, sends data processing tasks to the determined data processing server for execution, and receives processing results of performing data processing for the allocated sub-data ranges from the data processing servers.

A processing result receiving module 207, configured to receive a processing result of the to-be-processed data fed back by the task scheduler.

Specifically, the storage server includes: a data sorting submodule, an interval dividing submodule, a data statistics submodule and a distribution information obtaining submodule.

Where the data sorting submodule is configured to sort data records in the data region $R_i$ by a preset identifier.

The interval dividing submodule is configured to divide the data region $R_i$ into at least one data interval according to the sorted order of the sorted data records in the data region $R_i$.

The data statistics submodule is configured to obtain the number of data records in each of the at least one data interval through statistics.

The distribution information obtaining submodule is configured to obtain the data distribution information of the data records in the data region $R_i$ according to the numbers obtained through statistics.

Specifically, the distribution information obtaining submodule includes: a region variance calculating unit, a variance determining unit, a first information statistics unit and a second information statistics unit.

The region variance calculating unit is configured to calculate a variance of the number of data records in the data region $R_i$.

The variance determining unit is configured to determine whether the variance is greater than a preset data region variance threshold.

The first information statistics unit is configured to, when the variance is greater than the preset data region variance threshold, determine whether the following expression is satisfied: $N_{um} \geq Th_1$ or $N_{um} \leq Th_2$, and if it is satisfied, calculate through statistics the number of data records in each of the at least one data interval obtained from division of the data region $R_i$, and update the data distribution information with the numbers obtained from the statistics; wherein $N_{um}$ represents the number of data records in each of the at least one data interval obtained from division of the data region $R_i$, $Th_1$ represents a first preset number threshold, $Th_2$ represents a second preset number threshold, and $Th_1 \geq Th_2$.

The second information statistics unit is configured to, when the variance is not greater than the preset data region variance threshold, maintain the current data distribution information unchanged.

Specifically, the distribution information obtaining submodule may include: an adjustment condition determining unit and a first interval adjustment unit.

Wherein the adjustment condition determining unit is configured to determine whether the number of data records in the data region $R_i$ satisfies a preset data interval adjustment condition.

The first interval adjustment unit is configured to, when it is determined that the number of data records in the data region $R_i$ satisfies the preset data interval adjustment condition, adjust each of the at least one data interval in the data region $R_i$ according to a preset interval adjustment rule, and obtain the data distribution information of data records in the data region $R_i$ according to the number of data records in each of the adjusted at least one data interval.

Where the preset interval adjustment rule may include:

obtaining, in the data region $R_i$, a data interval having a number of data records greater than a first preset number threshold $Th_1$;

according to a preset data interval split rule, splitting the data interval having a number of data records greater than $Th_1$ into a plurality of sub-data intervals.

Specifically, the preset interval adjustment rule may further include:

obtaining, in the data region $R_i$, a data interval having a number of data records smaller than a second preset number threshold $Th_2$;

according to a preset data interval merge rule, merging data intervals having a number of data records smaller than $Th_2$.

Specifically, the adjustment condition determining unit includes: an interval variance calculating subunit, an interval variance determining subunit and a processing condition determining subunit.

The interval variance calculating subunit is configured to calculate a variance of the number of data records in each of the at least one data interval obtained through statistics.

The interval variance determining subunit is configured to determine whether the variance obtained from calculation is greater than a preset variance threshold.

The processing condition determining submit is configured to, when the variance is greater than the preset variance threshold, determine that the number of data records in each of the at least one data interval obtained through statistics satisfies the preset data interval processing condition.

It can be seen that with the solution provided by the present embodiment for data processing, the data processing tasks are allocated to respective data processing servers are allocated according to the number of data records in respective data regions, thereby avoiding the problem that the data processing tasks are unevenly allocated to the data processing servers, improving the parallel processing speed of data processing servers in the distributed data processing system, and thereby improving the overall processing performance of the distributed data processing system.

Figure 4:
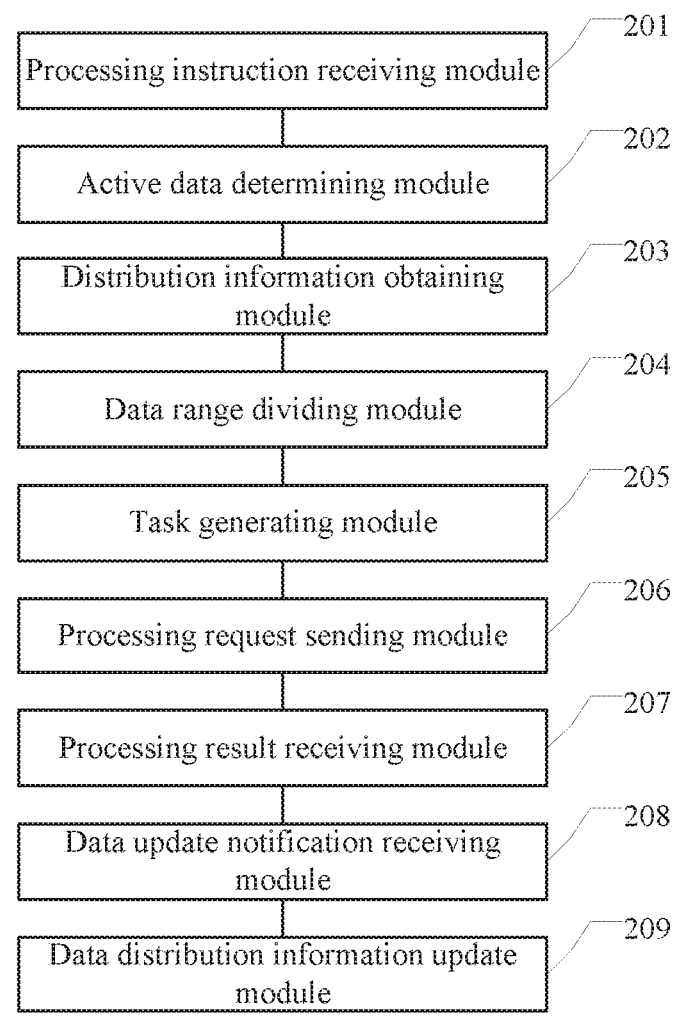
FIG. 4 is a schematic diagram of the structure of another data processing apparatus according to an embodiment of the present application.

FIG. 4 is a schematic diagram of the structure of another data processing apparatus according to an embodiment of the present application. On the basis of the apparatus embodiment shown in FIG. 3, the apparatus may further include:

a data update notification receiving module 208, configured to receive a data update notification from the storage server, in the case that the data distribution information has been stored at the client; and a data distribution information update module 209, configured to update the data distribution information stored locally, according to the data update notification.

This embodiment corresponds to the method embodiment shown in FIG. 2.

On the one hand, in the solution of the present embodiment, the locally stored data distribution information of data records in respective data regions is updated, which ensures consistency between the data distribution information obtained by the client and actual data distribution in the storage server. On the other hand, in the solution of the present embodiment for data processing, the data processing tasks are allocated to respective data processing servers according to the number of data records in respective data regions. This avoids the problem that the data processing tasks are unevenly allocated to the data processing servers, improves the parallel processing speed of data processing servers in the distributed data processing system, and thereby improves the overall processing performance of the distributed data processing system.

Being substantially similar to the method embodiment, the apparatus embodiment is described simply, and reference may be made to portions of the description of the method embodiment for relevant portions.

Embodiments of the present application provide a client device in a distributed data processing system, the distributed data processing system further includes: a task scheduler, a plurality of data processing servers and a plurality of storage servers; the storage servers store a plurality of data regions, each of which contains a plurality of data records. The client device includes:

a housing, a processor, a memory, a circuit board and a power supply circuit, wherein the circuit board is placed in a space enclosed by the housing, and the processor and memory are disposed on the circuit board; the power supply circuit is configured to supply power to circuits and components of the client device; the memory is configured to store executable program code; the processor executes a program corresponding to the executable program code by reading the executable program code stored in the memory, to perform the following steps:

receiving a data processing instruction for to-be-processed data;

determining an active data region according to the data processing instruction; wherein the active data region is a data region of the to-be-processed data;

obtaining data distribution information of data records in the active data region; wherein the data distribution information is information obtained by calculating the number of data records in each data region through statistics according to a preset statistical rule;

dividing a data range of each active data region into at least one sub-data range, according to the data distribution information;

generating a data processing task for each active data region according to each of the at least one sub-data range obtained from the division; wherein one data processing task corresponds to one sub-data range of an active data region;

sending a data processing request for the data processing task to the task scheduler, such that the task scheduler determines for each data processing task a data processing server to execute it, according to the data processing request, wherein the task scheduler, after determining data processing servers, sends data processing tasks to the determined data processing servers for execution, and receives processing results of performing data processing on the allocated sub-data ranges from the data processing servers;

receiving a processing result of to-be-processed data the fed back by the task scheduler.

The client device of this embodiment exists in various forms, which include but not limited to:

(1) mobile communication devices: such devices are characterized by the mobile communication function and mainly aim to provide voice and data communications. Such terminals include, for example, smart phones (e.g., iPhones), multi-media phones, functional phones, low-end phones.

(2) Ultra-mobile personal computer devices: such devices belong a category of personal computers, have computing and processing functions, and generally have the mobile Internet features. Such terminals include, for example, PDA, MID and UMPC, such as iPad.

(3) Portable entertainment devices: such devices may display and play multi-media content. Such devices include audio player, video player (e.g., iPods), handheld game player, E-books, smart toys and portable vehicle-mounted navigator.

(4) Other electronic devices having a digital interaction function.

As can be seen from the above, with the solution provided by the present embodiment for data processing, the data processing tasks are allocated to respective data processing servers according to the number of data records in respective data regions, thereby avoiding the problem that the data processing tasks are unevenly allocated to the data processing servers, improving the parallel processing speed of data processing servers in the distributed data processing system, and thereby improving the overall processing performance of the distributed data processing system.

Corresponding to the method embodiment, an embodiment of the present application further provide an application which, when executed, performs the data processing method according to embodiments of the present application. The data processing method includes:

receiving a data processing instruction for to-be-processed data;

determining an active data region according to the data processing instruction; wherein the active data region is a data region of the to-be-processed data;

obtaining data distribution information of data records in the active data region; wherein the data distribution information is information obtained by calculating the number of data records in each data region through statistics according to a preset statistical rule;

dividing a data range of each active data region into at least one sub-data range, according to the data distribution information;

generating a data processing task for each active data region according to each of the at least one sub-data range obtained from the division; wherein one data processing task corresponds to one sub-data range of an active data region;

sending a data processing request for the data processing task to the task scheduler, such that the task scheduler determines for each data processing task a data processing server to execute it, according to the data processing request, wherein the task scheduler, after determining data processing servers, sends data processing tasks to the determined data processing servers for execution, and receives processing results of performing data processing on the allocated sub-data ranges from the data processing servers;

receiving a processing result of to-be-processed data the fed back by the task scheduler.

As can be seen from the above, with the solution provided by the present embodiment for data processing, the data processing tasks are allocated to respective data processing servers according to the number of data records in respective data regions, thereby avoiding the problem that the data processing tasks are unevenly allocated to the data processing servers, improving the parallel processing speed of data processing servers in the distributed data processing system, and thereby improving the overall processing performance of the distributed data processing system.

Corresponding to the method embodiment, an embodiment of the present application further provide a storage medium which is used to store an application program which, when executed, performs the data processing method according to embodiments of the present application. The data processing method includes:

receiving a data processing instruction for to-be-processed data;

determining an active data region according to the data processing instruction; wherein the active data region is a data region of the to-be-processed data;

obtaining data distribution information of data records in the active data region; wherein the data distribution information is information obtained by calculating the number of data records in each data region through statistics according to a preset statistical rule;

dividing a data range of each active data region into at least one sub-data range, according to the data distribution information;

generating a data processing task for each active data region according to each of the at least one sub-data range obtained from the division; wherein one data processing task corresponds to one sub-data range of an active data region;

sending a data processing request for the data processing task to the task scheduler, such that the task scheduler determines for each data processing task a data processing server to execute it, according to the data processing request, wherein the task scheduler, after determining data processing servers, sends data processing tasks to the determined data processing servers for execution, and receives processing results of performing data processing on the allocated sub-data ranges from the data processing servers;

receiving a processing result of to-be-processed data the fed back by the task scheduler.

As can be seen from the above, with the solution of the present embodiment for data processing, the data processing tasks are allocated to respective data processing servers according to the number of data records in respective data regions, thereby avoiding the problem that the data processing tasks are unevenly allocated to the data processing servers, improving the parallel processing speed of data processing servers in the distributed data processing system, and thereby improving the overall processing performance of the distributed data processing system.

Noticeably, terms such as "first" and "second" herein are only used to distinguish one entity or operation from another entity or opreation, but do not necessarily require or imply that there is any actual relationship or order between these entities or operations. Furthermore, terms "comprise" and "include" and any variants thereof are intended to cover non-exclusive inclusion, such that a process, method, product or apparatus comprising a series of elements not only comprises those elements, but also comprises other elements not explicitly listed, or futher includes elements which are intrinsic for the process, method, product or apparatus. Without further limitations, an element defined by the wording "comprising a . . . " does not exclude existence of other identical elements in the process, method, product or apparatus including the element.

Those having ordinary skill in the art may understand all or some of the steps in the above method embodiments may be implemented by related hardware as instructed by a program. The program may be stored in a computer-readable storage medium. The storage medium herein may include: a Read-Only Memory (ROM)/Random Access Memory (RAM), a magnetic disk, or an optical disk.

The description above are only for preferred embodiments of the present application and not intended to limit scope of the present application. Any modifications, equivalent substitutions and improvements made within the spirit and principle of the present application all should be included in the extent of protection of the present application.

What is claimed is:

1. A data processing method, implemented on a client in a distributed data processing system; wherein the distributed data processing system comprises: the client, a task scheduler, a plurality of data processing servers and a plurality of storage servers; the plurality of storage servers store a plurality of data regions, each of which contains a plurality of data records, the data processing method comprising:

receiving a data processing instruction for to-be-processed data;

determining active data regions according to the data processing instruction; wherein each of the active data regions is a data region of the to-be-processed data;

obtaining data distribution information of data records in each active data region of the active data regions; wherein the data distribution information is information obtained by calculating a number of data records in each active data region through statistics according to a preset statistical rule;

dividing a data range of each of the active data regions into at least one sub-data range according to the data distribution information;

generating data processing tasks for the active data regions according to the at least one sub-data range obtained from the division; wherein one data processing task corresponds to one sub-data range of one active data region;

sending a data processing request for the data processing tasks to the task scheduler, such that the task scheduler determines for each of the data processing tasks a data processing server of the plurality of data processing servers to execute it, according to the data processing request, wherein the task scheduler, after determining the plurality of data processing servers, sends the data processing tasks to the determined plurality of data processing servers for execution, and receives processing results of performing the data processing tasks on allocated sub-data ranges from the plurality of data processing servers;

receiving a processing result of the to-be-processed data fed back by the task scheduler;

wherein a storage server of the plurality of storage servers obtains the data distribution information of data records in a data region $R_i$ of the active data regions through statistics by performing these following steps, wherein i is an integer number, i≥1, and $R_i$ represents an $i^{th}$ data region in the active data regions:

sorting, by the storage server of the plurality of storage servers, the data records in the data region $R_i$ by a preset identifier;

dividing the data region Ri into data intervals according to a sorted order of the sorted data records in the data region $R_i$;

obtaining a number of data records in each of the data intervals through statistics;

wherein obtaining the data distribution information of the data records in the data region $R_i$ according to the number of data records in each of the data intervals obtained through statistics, comprises:

determining whether the number of data records in each of the data intervals in the data region $R_i$ satisfies a preset data interval adjustment condition;

wherein the determining, by the storage server of the plurality of storage servers, whether the data region $R_i$ satisfies the preset data interval adjustment condition comprises:

calculating a variance of the number of data records in each of the data intervals in the data region $R_i$ obtained through statistics;

determining whether the variance obtained from the calculation is greater than a preset variance threshold;

if the variance is greater than the preset variance threshold, determining that the number of data records in each of the data intervals in the data region $R_i$ obtained through statistics satisfies the preset data interval adjustment condition;

when the variance is greater than the preset variance threshold, adjusting each of the data intervals in the data region $R_i$ according to a preset interval adjustment rule, and obtaining the data distribution information of data records in the data region $R_i$ according to a number of data records in each of the adjusted data intervals;

wherein the preset interval adjustment rule comprises:

obtaining, in the data region $R_i$, data intervals having a number of data records greater than a first preset number threshold $Th_1$, and obtaining, in the data region $R_i$, data intervals having a number of data records smaller than a second preset number threshold $Th_2$, wherein $Th_1 \geq Th_2$;

according to a preset data interval split rule, splitting each of the data intervals in the data region $R_i$ having a number of data records greater than $Th_1$ into a plurality of sub-data intervals; and according to a preset data interval merge rule, merging data intervals in the data region $R_i$ having a number of data records smaller than $Th_2$.

2. The data processing method of claim 1, wherein in a case that the client has stored the data distribution information, the data processing method further comprises:

receiving a data update notification from the storage server of the plurality of storage servers;

updating the data distribution information stored locally, according to the data update notification.

3. A data processing apparatus, implemented on a client in a distributed data processing system; wherein the distributed data processing system comprises: the client, a task scheduler, a plurality of data processing servers and a plurality of storage servers; the plurality of storage servers store a plurality of data regions, each of which contains a plurality of data records, the data processing apparatus comprising:

a processing instruction receiving module, configured to receive a data processing instruction for to-be-processed data;

an active data determining module, configured to determine active data regions according to the data processing instruction; wherein each of the active data regions is a data region of the to-be-processed data;

a distribution information obtaining module, configured to obtain data distribution information of data records in each active data region of the active data regions; wherein the data distribution information is information obtained by calculating a number of data records in each active data region through statistics according to a preset statistical rule;

a data range dividing module, configured to divide a data range of each of the active data regions into at least one sub-data range according to the data distribution information;

a task generating module, configured to generate data processing tasks for the active data regions according to the at least one sub-data range obtained from the division; wherein one data processing task corresponds to one sub-data range of one active data region;

a processing request sending module, configured to send a data processing request for the data processing tasks to the task scheduler, such that the task scheduler determines for each of the data processing tasks a data processing server of the plurality of data processing servers to execute it, according to the data processing request; wherein the task scheduler, after determining the plurality of data processing servers, sends the data processing tasks to the determined plurality of data processing servers for execution, and receives processing results of performing the data processing tasks on allocated sub-data ranges from the plurality of data processing servers;

a processing result receiving module, configured to receive a processing result of the to-be-processed data fed back by the task scheduler;

wherein a storage server of the plurality of storage servers comprises: a data sorting submodule, an interval dividing submodule, a data statistics submodule and a distribution information obtaining submodule; wherein the data sorting submodule is configured to sort data records in a data region $R_i$ by a preset identifier, wherein i is an integer number, i≥1, and $R_i$ represents an $i^{th}$ data region in the active data regions;

the interval dividing submodule is configured to divide the data region $R_i$ into data intervals according to a sorted order of the sorted data records in the data region $R_i$;

the data statistics submodule is configured to obtain a number of data records in each of the data intervals through statistics;

the distribution information obtaining submodule is configured to obtain the data distribution information of the data records in the data region $R_i$ according to the number of data records in each of the data intervals obtained through statistics;

wherein the distribution information obtaining submodule comprises: an adjustment condition determining unit and a first interval adjustment unit, wherein the adjustment condition determining unit is configured to determine whether the number of data records in each of the data intervals in the data region $R_i$ satisfies a preset data interval adjustment condition;

wherein the adjustment condition determining unit comprises: an interval variance calculating subunit, an interval variance determining subunit and a processing condition determining subunit; wherein the interval variance calculating subunit is configured to calculate a variance of the number of data records in each of the data intervals in the data region $R_i$ obtained through statistics;

the interval variance determining subunit is configured to determine whether the variance obtained from the calculation is greater than a preset variance threshold; and the processing condition determining subunit is configured to, when the variance is greater than the preset variance threshold, determine that the number of data records in each of the data intervals in the data region $R_i$ obtained through statistics satisfies the preset data interval processing condition;

the first interval adjustment unit is configured to, when the variance is greater than the preset variance threshold, adjust each of the data intervals in the data region $R_i$ according to a preset interval adjustment rule, and obtain the data distribution information of data records in the data region $R_i$ according to a number of data records in each of the adjusted data intervals;

wherein the preset interval adjustment rule comprises:

obtaining, in the data region $R_i$, data intervals having a number of data records greater than a first preset number threshold $Th_1$, and obtaining, in the data region $R_i$, data intervals having a number of data records smaller than a second preset number threshold $Th_2$, wherein $Th_1 \geq Th_2$;

according to a preset data interval split rule, splitting each of the data intervals in the data region $R_i$ having a number of data records greater than $Th_1$ into a plurality of sub-data intervals; and according to a preset data interval merge rule, merging data intervals in the data region $R_i$ having a number of data records smaller than $Th_2$.

4. The data processing apparatus of claim 3, wherein the data processing apparatus further comprises:

a data update notification receiving module, configured to receive a data update notification from the storage server of the plurality of storage servers, in a case that the data distribution information has been stored at the client; and a data distribution information update module, configured to update the data distribution information stored locally, according to the data update notification.

5. A client device in a distributed data processing system, wherein the distributed data processing system further comprises: a task scheduler, a plurality of data processing servers and a plurality of storage servers; the plurality of storage servers store a plurality of data regions, each of which contains a plurality of data records; the client device comprising:

a housing, a processor, a memory, a circuit board and a power supply circuit, wherein the circuit board is placed in a space enclosed by the housing, and the processor and the memory are disposed on the circuit board; the power supply circuit is configured to supply power to circuits or components of the client device; the memory is configured to store executable program code; the processor executes a program corresponding to the executable program code by reading the executable program code stored in the memory, to perform the following steps:

receiving a data processing instruction for to-be-processed data;

determining active data regions according to the data processing instruction; wherein each of the active data regions is a data region of the to-be-processed data;

obtaining data distribution information of data records in each active data region of the active data regions; wherein the data distribution information is information obtained by calculating a number of data records in each active data region through statistics according to a preset statistical rule;

dividing a data range of each of the active data regions into at least one sub-data range according to the data distribution information;

generating data processing tasks for the active data regions according to the at least one sub-data range obtained from the division; wherein one data processing task corresponds to one sub-data range of one active data region;

sending a data processing request for the data processing tasks to the task scheduler, such that the task scheduler determines for each of the data processing tasks a data processing server of the plurality of data processing servers to execute it, according to the data processing request, wherein the task scheduler, after determining the plurality of data processing servers, sends the data processing tasks to the determined plurality of data processing servers for execution, and receives processing results of performing the data processing tasks on allocated sub-data ranges from the plurality of data processing servers;

receiving a processing result of the to-be-processed data fed back by the task scheduler;

wherein a storage server of the plurality of storage servers obtains the data distribution information of data records in a data region $R_i$ of the active data regions through statistics by performing these following steps, wherein i is an integer number, $i \geq 1$, and $R_i$ represents an $i^{th}$ data region in the active data regions:

sorting, by the storage server of the plurality of storage servers, the data records in the data region $R_i$ by a preset identifier;

dividing the data region $R_i$ into data intervals according to a sorted order of the sorted data records in the data region $R_i$;

obtaining a number of data records in each of the data intervals through statistics;

wherein obtaining the data distribution information of the data records in the data region $R_i$ according to the number of data records in each of the data intervals obtained through statistics, comprises:

determining whether the number of data records in each of the data intervals in the data region $R_i$ satisfies a preset data interval adjustment condition;

wherein the determining, by the storage server of the plurality of storage servers, whether the data region $R_i$ satisfies the preset data interval adjustment condition comprises:
- calculating a variance of the number of data records in each of the data intervals in the data region $R_i$ obtained through statistics;
- determining whether the variance obtained from the calculation is greater than a preset variance threshold;
- if the variance is greater than the preset variance threshold, determining that the number of data records in each of the data intervals in the data region $R_i$ obtained through statistics satisfies the preset data interval adjustment condition;

when the variance is greater than the preset variance threshold, adjusting each of the data intervals in the data region $R_i$ according to a preset interval adjustment rule, and obtaining the data distribution information of data records in the data region $R_i$ according to a number of data records in each of the adjusted data intervals;

wherein the preset interval adjustment rule comprises:
- obtaining, in the data region $R_i$, data intervals having a number of data records greater than a first preset number threshold $Th_1$, and obtaining, in the data region $R_i$, data intervals having a number of data records smaller than a second preset number threshold $Th_2$, wherein $Th_1 \geq Th_2$;
- according to a preset data interval split rule, splitting each of the data intervals in the data region $R_i$ having a number of data records greater than $Th_1$ into a plurality of sub-data intervals; and
- according to a preset data interval merge rule, merging data intervals in the data region $R_i$ having a number of data records smaller than $Th_2$.

6. A non-transitory storage medium configured to store an application program which, when executed, performs operations of:
- receiving a data processing instruction for to-be-processed data;
- determining active data regions according to the data processing instruction; wherein each of the active data regions is a data region of the to-be-processed data;
- obtaining data distribution information of data records in each active data region of the active data regions; wherein the data distribution information is information obtained by calculating a number of data records in each active data region through statistics according to a preset statistical rule;
- dividing a data range of each of the active data regions into at least one sub-data range according to the data distribution information;
- generating data processing tasks for the active data regions according to the at least one sub-data range obtained from the division; wherein one data processing task corresponds to one sub-data range of one active data region;
- sending a data processing request for the data processing tasks to a task scheduler, such that the task scheduler determines for each of the data processing tasks a data processing server to execute it, according to the data processing request, wherein the task scheduler, after determining data processing servers, sends the data processing tasks to the determined data processing servers for execution, and receives processing results of performing the data processing tasks on allocated sub-data ranges from the data processing servers;
- receiving a processing result of the to-be-processed data fed back by the task scheduler;

wherein a storage server obtains the data distribution information of data records in a data region $R_i$ of the active data regions through statistics by performing these following steps, wherein i is an integer number, $i \geq 1$, and $R_i$ represents an $i^{th}$ data region in the active data regions:
- sorting, by the storage server, the data records in the data region $R_i$ by a preset identifier;
- dividing the data region $R_i$ into data intervals according to a sorted order of the sorted data records in the data region $R_i$;
- obtaining a number of data records in each of the data intervals through statistics;

wherein obtaining the data distribution information of the data records in the data region $R_i$ according to the number of data records in each of the data intervals obtained through statistics, comprises:
- determining whether the number of data records in each of the data intervals in the data region $R_i$ satisfies a preset data interval adjustment condition;
  - wherein the determining, by the storage server, whether the data region $R_i$ satisfies the preset data interval adjustment condition comprises:
    - calculating a variance of the number of data records in each of the data intervals in the data region $R_i$ obtained through statistics;
    - determining whether the variance obtained from the calculation is greater than a preset variance threshold;
    - if the variance is greater than the preset variance threshold, determining that the number of data records in each of the data intervals in the data region $R_i$ obtained through statistics satisfies the preset data interval adjustment condition;
- when the variance is greater than the preset variance threshold, adjusting each of the data intervals in the data region $R_i$ according to a preset interval adjustment rule, and obtaining the data distribution information of data records in the data region $R_i$ according to a number of data records in each of the adjusted data intervals;

wherein the preset interval adjustment rule comprises:
- obtaining, in the data region $R_i$, data intervals having a number of data records greater than a first preset number threshold $Th_1$, and obtaining, in the data region $R_i$, data intervals having a number of data records smaller than a second preset number threshold $Th_2$, wherein $Th_1 \geq Th_2$;
- according to a preset data interval split rule, splitting each of the data intervals in the data region $R_i$ having a number of data records greater than $Th_1$ into a plurality of sub-data intervals; and
- according to a preset data interval merge rule, merging data intervals in the data region $R_i$ having a number of data records smaller than $Th_2$.

* * * * *